United States Patent
Rozman et al.

(10) Patent No.: US 7,400,117 B1
(45) Date of Patent: Jul. 15, 2008

(54) GENERATING SYSTEM WITH A REGULATED PERMANENT MAGNET MACHINE AND AN ACTIVE RECTIFIER

(75) Inventors: Gregory I. Rozman, Rockford, IL (US); Vijay K. Maddali, Rockford, IL (US); Kevin Dooley, Ontario (CA)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 8 days.

(21) Appl. No.: 11/820,784

(22) Filed: Jun. 20, 2007

(51) Int. Cl.
  *H02K 29/06* (2006.01)
(52) U.S. Cl. .............................. 322/45; 322/46; 322/54; 322/58; 322/61; 322/69
(58) Field of Classification Search ................. 322/45, 322/46, 54, 58, 61, 69
  See application file for complete search history.

(56) References Cited

U.S. PATENT DOCUMENTS

| | | | |
|---|---|---|---|
| 5,493,200 A * | 2/1996 | Rozman et al. ................ | 322/10 |
| 5,929,537 A * | 7/1999 | Glennon ....................... | 307/46 |
| 6,741,067 B2 * | 5/2004 | Taniguchi et al. ............. | 322/28 |

OTHER PUBLICATIONS

U.S. Appl. No. 10/996,441, Kevin Dooley.
U.S. Appl. No. 11/420,614, Kevin Dooley.

\* cited by examiner

*Primary Examiner*—Darren Schuberg
*Assistant Examiner*—Iraj A Mohandesi
(74) *Attorney, Agent, or Firm*—Stephen G. Mican

(57) ABSTRACT

An electromechanical power transfer system that transfers power between a prime mover and a direct current (DC) electrical system, comprises: a permanent magnet machine (PMM) that has a permanent magnet (PM) rotor coupled to the prime mover, a stator with a multiphase alternating current (AC) winding coupled to an AC bus and a control coil with a winding that has a configuration to generate a magnetic field with flux that varies the reactance of the stator winding with the application of control coil current; a control coil current sensor for generating a control coil current signal that is representative of the level of electrical current in the control coil; an electrical current sensor for generating a DC bus current signal that is representative of the level of DC current through the DC bus; an electrical potential sensor for generating a DC bus potential signal that is representative of the level of DC potential on the DC bus; a fixed pattern active rectifier and inverter system coupled between the AC bus and a DC bus; a position sensing system for generating a rotor position signal that is representative of the angular position of the PM rotor; and a control coil current regulator system that regulates the control coil current.

17 Claims, 1 Drawing Sheet

GENERATING SYSTEM WITH A REGULATED PERMANENT MAGNET MACHINE AND AN ACTIVE RECTIFIER

FIELD OF THE INVENTION

The invention relates to electric power generation systems, and more particularly to prime mover powered electric power generation systems capable of delivering direct current (DC).

BACKGROUND OF THE INVENTION

Electrical power generation systems powered by variable speed prime movers that require highly regulated electrical output, such as electrical power generation systems used for aeronautical applications, generally use a wound field synchronous machine (WFSM) that serves as an electrical generator. This is because it is easy to adjust rotor current to regulate electrical output of a WFSM. In aeronautical applications, the prime mover is often a gas turbine engine that has a normal rotational velocity that exceeds 20,000 revolutions per minute (rpm). Due to the rotational velocity limitations of the WFSM, such electrical power generation systems generally require a reduction gearbox between the prime mover and the WFSM. This increases weight, cost and complexity of the electrical power generation systems.

Electrical power generation systems may alternatively employ an electrical machine of the permanent magnet type as an electrical generator. Such a permanent magnet machine (PMM) is capable of much higher rotational velocity than a WFSM of similar output and therefore it is capable of direct coupling to the prime mover, thereby eliminating the reduction gearbox. This results in reduced weight, cost and complexity of an electrical power generation system. However, a traditional PM PMM, with its permanent magnet rotor, has no convenient means to alter magnetic flux of the PMM rotor field that passes through its stator to regulate its output.

SUMMARY OF THE INVENTION

The invention generally comprises an electromechanical power transfer system that transfers power between a prime mover and a direct current (DC) electrical system, comprising: a permanent magnet machine (PMM) that has a permanent magnet (PM) rotor coupled to the prime mover, a stator with a multiphase alternating current (AC) winding coupled to an AC bus and a control coil with a winding that has a configuration to generate a magnetic field with flux that varies the reactance of the stator winding with the application of control coil current; a position sensing system for generating a rotor position signal that is representative of the angular position of the PM rotor; a control coil current sensor for generating a control coil current signal that is representative of the level of electrical current in the control coil; an electrical current sensor for generating a DC bus current signal that is representative of the level of DC current through the DC bus; an electrical potential sensor for generating a DC bus potential signal that is representative of the level of DC potential on the DC bus; a fixed pattern active rectifier and inverter system coupled between the AC bus and a DC bus; and a control coil current regulator system that regulates the control coil current; wherein the control coil current regulator system receives the DC bus current signal in a DC bus current feedback loop and the control coil current signal in a control coil current feedback loop to generate a corresponding level of the control coil current that regulates current in the stator to a desired level and in a generating mode the fixed pattern active rectifier and inverter system receives the DC bus potential signal in a DC bus potential feedback loop and the rotor position signal in a rotor position feedback loop to maintain a constant potential on the DC bus regardless of sudden changes in electrical load on the DC bus.

DETAILED DESCRIPTION OF THE INVENTION

Figure 1:
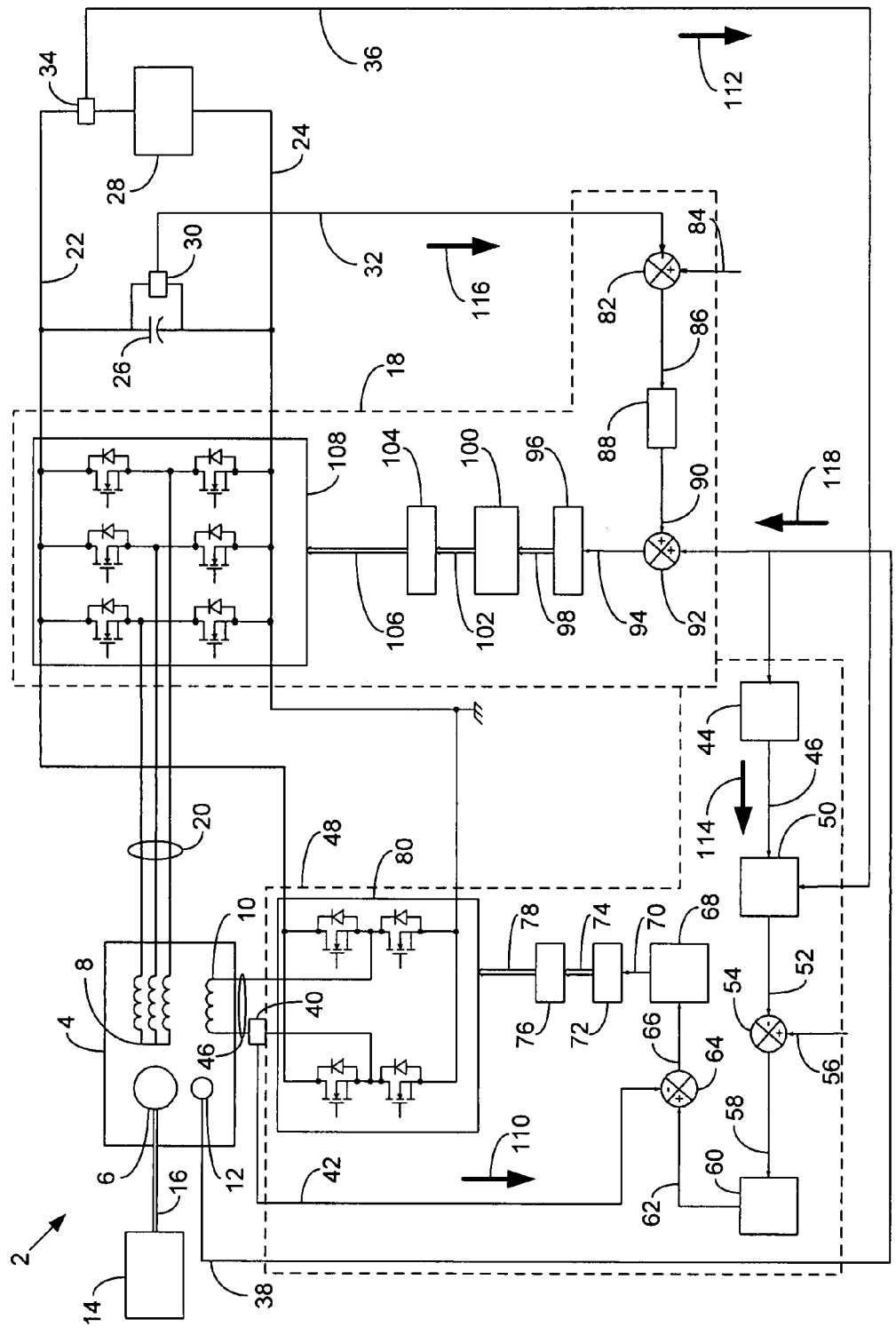
FIG. 1 is a high-level schematic diagram of an electrical power generation system according to a possible embodiment of the invention.

FIG. 1 is a high-level schematic diagram of an electrical power generation system 2 according to a possible embodiment of the invention. The electrical power generation system 2 comprises a PMM 4 that comprises a permanent magnet (PM) rotor 6, a stator 8, a control coil 10 and a position sensor 12. The rotor 6 comprises a permanent magnet type rotor. The stator 8 comprises a multiphase alternating current (AC) stator winding that is typically three phase AC. The control coil 10 comprises a winding in proximity to the stator winding 8 that is capable of generating a magnetic field with flux that passes through the stator winding 8 upon application of electrical current through the control coil 10. The position sensor 12 may be of any convenient type that is suitable for establishing the rotary position of the rotor 6. PMM 4 may have any suitable construction. An example of a suitable construction is found in co-pending application Ser. Nos. 10/996,411 and 11/420,614, by Dooley, both incorporated herein by reference. With a PMM 4 of such construction, control coil 10 generates a magnetic field with flux that is capable of selectively saturating a portion of a magnetic circuit associated with a stator 8 upon application of electrical current through the control coil 10, thereby varying the reactance of the stator 8. The flux of the control coil field varies the reactance of the stator 8 over a very wide range, thereby permitting control of PMM output current rather than generated electromagnetic force (emf). This design also has an intrinsic magnetic feedback feature that causes the reactance of the PMM to remain at a minimum value until the output current attains a specific ratio to the control current, at which point the reactance abruptly increases with output current. This makes the PMM behave as a constant current source regardless of electrical load. The incorporated references describe further details of the construction and operation of such a PMM 4.

A prime mover 14, such as a gas turbine engine, drives the rotor 6 by way of a drive shaft 16. The rotating magnetic field that the rotor 6 generates develops multi-phase AC emf in the windings of the stator 8. A fixed pattern active rectifier system 18 receives the AC emf from the windings of the stator 8 by way of an AC bus 20 and converts the AC electrical potentials on the AC bus 20 to a DC potential between a DC bus line 22 and a DC return line 24. A capacitor 26 between the DC bus line 22 and the DC return line 24 may reduce or eliminate any AC ripple and noise on the DC bus line 22 due to the rectifying action of the fixed pattern active rectifier system 18. An electrical load 28 passes DC current in response to the DC potential between the DC bus line 22 and the DC return line 24. The fixed pattern active rectifier system 18 eliminates transients on the DC bus line 22 due to sudden changes in value of the electrical load 28. An electrical DC potential sensor 30 senses DC potential across the DC bus line 22 and the DC return line 24 to produce a DC bus potential signal VDC_FDBK on a DC potential sensor output line 32 that is representative of the DC potential across the DC bus line 22 and the DC return line 24.

An electrical DC current sensor 34 measures DC current that passes from the DC bus line 22 through the electrical load 28 to the DC return line 24 to produce a DC bus current signal IDC_FDBK on a DC current sensor output line 36 that is representative of the DC current that passes from the DC bus line 22 through the electrical load 28 to the DC return line 24.

The position sensor 12 measures the angular position of the rotor 6 and produces a rotor position signal POS_FDBK on a position sensor output line 38 that is representative of the measured angular position. A control coil current sensor 40 measures the level of electrical current that passes through the control coil 10 and produces a control coil current signal ICC_FDBK on a control coil current sensor output line 42 that is representative of the level of control coil current that passes through the control coil 10. Optionally, a speed detector 44 receives the rotor position signal on the position signal output line 38 and produces a rotor speed signal SPD_FDBK on a speed detector output line 46 that is representative of the angular velocity of the rotor 6. A control current regulator system 48 supplies control coil current to the control coil 10 by way of a pair of control coil current supply lines 46 to regulate the current output of the PMM 4 regardless of changes in the value of the electrical load 28. The control current regulator system 48 adjusts the control coil current in response to the DC bus current signal on the DC current sensor output line 36, the control coil current signal on the control coil current sensor output line 46 and optionally the rotor speed signal on the speed detector output line 38.

The operation of the control current regulator system 48 is as follows. A back emf look-up table 50 stores values of back emf generated by the PMM 4 as a function of the angular velocity of the rotor 6 and DC current that it supplies to the electrical load 28. The back emf look-up table 50 receives the DC bus current signal on the DC current sensor output line 36 and optionally the rotor speed signal on the speed detector output line 46, selects a value of back emf for the PMM 4 that is representative of these signal combinations and produces a back emf signal BEMF_FDBK on a back emf look-up table output line 52 that is representative of the selected value of back emf. A back emf error comparator 54 compares the back emf signal on the back emf look-up table output line 52 with a back emf reference signal on a back emf reference signal line 56 that is representative of a desired value of back emf for the PMM 4 and produces a back emf error signal BEMF_ERROR on a back emf error comparator output signal line 58 that is representative of the difference in these signals.

A back emf error proportional-integral (PI) controller 60 receives the back emf error signal on the back emf error comparator output signal line 58 and generates a corresponding reference control coil current signal ICC_REF on a back emf error PI controller output signal line 62 that is representative of a desired value of control coil current to generate the desired value of back emf in the PMM 4. A control coil current error comparator 64 compares the control coil current signal on the control coil current sensor output line 42 with the reference control coil current signal on the back emf error PI controller output signal line 62 to generate a control coil current error signal I_ERROR on a control coil current comparator output signal line 66 that is representative of the difference in these signals. A control coil current error PI controller 68 receives the control coil current error comparator output signal on the control coil current comparator output signal line 66 to generate a corresponding control coil current correction signal on a control coil current error PI controller output line 70. A control coil circuit pulse width modulation (PWM) modulator 72 receives the control coil current correction signal on the control coil current error PI controller output line 70 and generates a plurality of control coil circuit PWM signals on a corresponding plurality of control coil circuit PWM modulator output lines 74. A control coil circuit gate drives module 76 receives the plurality of control coil circuit PWM signals on the control coil circuit PWM modulator output lines 74 and generates a plurality of control coil circuit gate drive signals on a corresponding plurality of control coil circuit gate drives module output lines 78.

A control coil current regulator 80 receives the plurality of control coil circuit gate drive signals on the control coil circuit gate drives module output lines 78 to convert power that it receives from the DC bus 22 to create the control coil current through the control coil 10 by way of the control coil current supply lines 46. The control coil 10 thus generates a magnetic control field in the PMM 4 whose magnetic flux varies the reactance of the stator 8 over a very wide range, thereby permitting control of the output current of the PMM 4 rather than generated emf.

The operation of the fixed pattern active rectifier system 18 is as follows. A DC potential difference comparator 82 compares the DC bus potential signal on the DC potential sensor output line 32 with a reference DC potential signal VDC_REF on a reference potential line 84 and generates a DC potential error signal VDC_ERROR on a DC potential difference comparator output line 86 that is representative of the difference of these signals. A DC potential error PI controller 88 receives the DC potential error signal on the DC potential difference comparator output line 86 and generates a corresponding angle control signal ANGLE_CTRL on a DC potential error PI controller output line 90. A summer 92 receives the angle control signal on the DC potential error PI controller output line 90 and the position signal on the position signal output line 38 to generate an active rectifier control signal on a summer output line 94.

A vector rotator module 96 receives the active rectifier control signal on the angle comparator output line 94 and generates a plurality of vector rotation signals on a corresponding plurality of vector rotator module output lines 98. A fixed pattern active rectifier circuit PWM modulator 100 receives the vector rotation signals on the vector rotator module output lines 98 and generates a plurality of active rectifier circuit PWM signals on a corresponding plurality of active rectifier circuit PWM modulator output lines 102. An active rectifier circuit gate drives module 104 receives the active rectifier circuit PWM signals on the rectifier circuit PWM modulator output lines 102 and generates a plurality of active rectifier circuit gate drive signals on a corresponding plurality of active rectifier circuit gate drives module output lines 106. A fixed pattern active rectifier circuit 108 receives the active rectifier circuit gate drive signal on the active rectifier circuit gate drive module output lines 106 and controls the DC potential on the DC bus 22 in response to these signals. The fixed pattern active rectifier system 18 thus changes the DC output potential on the DC bus line 22 in response to sensed DC potential on the DC bus line 22 and the position signal on the position sensor output line 38 to regulate the DC potential that the fixed pattern active rectifier system 18 produces on the DC bus line 22 whilst eliminating harmonic ripple with its fixed pattern operation.

In summary the control coil current regulator system 48 regulates the output current of the PMM 4 by controlling current that the control coil 10 receives by way of a control coil current feedback loop 110 that comprises the control coil current signal on the control coil current sensor output line 42, an electrical DC bus current feedback loop 112 comprising the DC bus current signal on the DC current sensor output line 36 and optionally a rotor speed feedback loop 114 comprising the speed detector output signal on the speed detector output line 46. The fixed pattern active rectifier system 18 eliminates transients on the DC bus line 22 due to sudden changes in the value of the electrical load 28 by way of an electrical DC potential feedback loop 116 that comprises the DC bus potential signal on the DC potential sensor output line 32 and a rotor position feedback loop 118 comprising the rotor position signal on the position sensor output line 38 and the electrical DC bus potential signal on the DC potential sensor output line 32.

The electrical power generation system 2 may also comprise an electromechanical power transfer system that has a generating mode and a starting mode. In the starting mode the PMM 4 serves as a starter motor, the fixed pattern active rectifier system 18 as an inverter system and a DC power source replaces the electrical load 28.

The described embodiments of the invention are only some illustrative implementations of the invention wherein changes and substitutions of the various parts and arrangement thereof are within the scope of the invention as set forth in the attached claims.

The claimed invention is:

1. An electromechanical power transfer system that transfers power between a prime mover and a direct current (DC) electrical system, comprising:
    a permanent magnet machine (PMM) that has a permanent magnet (PM) rotor coupled to the prime mover, a stator with a multiphase alternating current (AC) winding coupled to an AC bus and a control coil with a winding that has a configuration to generate a magnetic field with flux that varies the reactance of the stator winding with the application of control coil current;
    a position sensing system for generating a rotor position signal that is representative of the angular position of the PM rotor;
    a control coil current sensor for generating a control coil current signal that is representative of the level of electrical current in the control coil;
    an electrical current sensor for generating a DC bus current signal that is representative of the level of DC current through the DC bus;
    an electrical potential sensor for generating a DC bus potential signal that is representative of the level of DC potential on the DC bus;
    a fixed pattern active rectifier and inverter system coupled between the AC bus and a DC bus; and
    a control coil current regulator system that regulates the control coil current;
    wherein the control coil current regulator system receives the DC bus current signal in a DC bus current feedback loop and the control coil current signal in a control coil current feedback loop to generate a corresponding level of the control coil current that regulates current in the stator to a desired level and in a generating mode the fixed pattern active rectifier and inverter system receives the DC bus potential signal in a DC bus potential feedback loop and the rotor position signal in a rotor position feedback loop to maintain a constant potential on the DC bus regardless of sudden changes in electrical load on the DC bus.

2. The power transfer system of claim 1, wherein the fixed pattern active rectifier and inverter system converts DC power on the DC bus to AC power on the AC bus in a prime mover starting mode so that the PMM may start the prime mover.

3. The power transfer system of claim 1, wherein the control coil current regulator system comprises:

a look-up table that receives the DC bus current signal, selects a value of back emf for the PMM that is representative of the DC bus current signal and produces a back emf signal that is representative of the selected value of back emf;
    a back emf comparator for comparing the back emf signal to a reference emf signal and generating an emf error signal representative of the difference between the back emf signal and the reference emf signal;
    a back emf proportional-integral (PI) controller for receiving the emf error signal and generating a corresponding reference control coil current reference signal;
    a control coil current error comparator for comparing the control coil current signal with the reference control coil current signal and generating a control coil current error signal representative of the difference between the control coil current signal and the reference control coil current signal;
    a control coil current error PI controller for receiving the control coil current error signal and generating a corresponding control coil current correction signal;
    a control coil current regulator that supplies the control coil with current that has a level corresponding to the value of the reference control coil current signal;
    a control coil circuit pulse width modulation (PWM) modulator that receives the control coil current correction signal and generates a plurality of control coil circuit PWM signals; and
    a control coil circuit gate drives module that receives the plurality of control coil circuit PWM signals and generates a plurality of control circuit gate drive signals that drive the control coil current regulator to regulate the current developed by the PMM.

4. The power transfer system of claim 3, further comprising a speed sensor that receives the rotor position signal and generates a rotor speed signal representative of the angular speed of the PM rotor in a rotor speed feedback loop, and wherein the lookup table receives the rotor speed signal and the DC bus current signal, selects a value of back emf for the PMM that is representative of these signal combinations and produces a back emf signal that is representative of the selected value of back emf.

5. The power transfer system of claim 1, wherein the fixed pattern active rectifier and inverter system comprises:
    a DC potential difference comparator for comparing the DC bus potential signal with a reference DC bus potential signal and generating a DC potential error signal that is representative of the difference between the DC bus potential signal and the reference DC bus potential signal;
    a DC potential error PI controller for receiving the DC potential error signal and generating a corresponding angle control signal; and
    a summer for combining the rotor position signal with the angle control signal to generate an active rectifier control signal;
    a vector rotation module for receiving the active rectifier control signal and generating a plurality of vector rotation signals;
    a fixed pattern active rectifier circuit PWM modulator for receiving the vector rotation signals and generating a plurality of active rectifier circuit PWM signals; and
    an active rectifier circuit gate drives module for receiving the active rectifier circuit PWM signals and generating a plurality of active rectifier circuit gate drive signals that drive the fixed pattern active rectifier and inverter system to regulate the DC potential on the DC bus.

6. The power transfer system of claim 1, further comprising a speed sensor that receives the rotor position signal and generates a rotor speed signal representative of the angular speed of the PM rotor in a rotor speed feedback loop, wherein the control coil current regulator additionally receives the rotor position signal to generate a level of the control coil current that regulates current in the stator to a desired level.

7. The power transfer system of claim 1, wherein the flux of the control coil magnetic field may selectively saturate a portion of a magnetic circuit associated with the stator to vary the reactance of the stator.

8. The power transfer system of claim 7, wherein the control coil field flux varies the reactance of the stator to control output current of the PMM through the AC bus.

9. A generating system that converts mechanical power from a prime mover to direct current (DC) electrical power for an electrical load, comprising:
- a permanent magnet machine (PMM) that has a permanent magnet (PM) rotor driven by the prime mover, a stator with a multiphase alternating current (AC) winding for developing multiphase electromotive force (emf) in response to rotation of the PM rotor coupled to an AC bus and a control coil with a winding that that has a configuration to generate a magnetic field with flux that varies the reactance of the stator winding with the application of control coil current;
- a position sensing system for generating a rotor position signal that is representative of the angular position of the PM rotor;
- a control coil current sensor for generating a control coil current signal that is representative of the level of electrical current in the control coil;
- an electrical current sensor for generating a DC bus current signal that is representative of the level of DC current through the DC bus;
- an electrical potential sensor for generating a DC bus potential signal that is representative of the level of DC potential on the DC bus;
- a fixed pattern active rectifier system coupled between the AC bus and a DC bus; and
- a control coil current regulator system that regulates the control coil current;
- wherein the control coil current regulator system receives the DC bus current signal in a DC bus current feedback loop and the control coil current signal in a control coil current feedback loop to generate a corresponding level of the control coil current that regulates current in the stator to a desired level and in a generating mode the fixed pattern active rectifier system receives the DC bus potential signal in a DC bus potential feedback loop and the rotor position signal in a rotor position feedback loop to maintain a constant potential on the DC bus regardless of sudden changes in electrical load on the DC bus.

10. The generating system of claim 9, wherein the control coil current regulator system comprises:
- a look-up table that receives the DC bus current signal, selects a value of back emf for the PMM that is representative of the DC bus current signal and produces a back emf signal that is representative of the selected value of back emf;
- a back emf comparator for comparing the back emf signal to a reference emf signal and generating an emf error signal representative of the difference between the back emf signal and the reference emf signal;
- a back emf proportional-integral (PI) controller for receiving the emf error signal and generating a corresponding reference control coil current reference signal;
- a control coil current error comparator for comparing the control coil current signal with the reference control coil current signal and generating a control coil current error signal representative of the difference between the control coil current signal and the reference control coil current signal;
- a control coil current error PI controller for receiving the control coil current error signal and generating a corresponding control coil current correction signal;
- a control coil current regulator that supplies the control coil with current that has a level corresponding to the value of the reference control coil current signal;
- a control coil circuit pulse width modulation (PWM) modulator that receives the control coil current correction signal and generates a plurality of control coil circuit PWM signals; and
- a control coil circuit gate drives module that receives the plurality of control coil circuit PWM signals and generates a plurality of control circuit gate drive signals that drive the control coil current regulator to regulate the current developed by the PMM.

11. The generating system of claim 10, further comprising a speed sensor that receives the rotor position signal and generates a rotor speed signal representative of the angular speed of the PM rotor in a rotor speed feedback loop, and wherein the lookup table receives the rotor speed signal and the DC bus current signal, selects a value of back emf for the PMM that is representative of these signal combinations and produces a back emf signal that is representative of the selected value of back emf.

12. The generating system of claim 9, wherein the fixed pattern active rectifier system comprises:
- a DC potential difference comparator for comparing the DC bus potential signal with a reference DC bus potential signal and generating a DC potential error signal that is representative of the difference between the DC bus potential signal and the reference DC bus potential signal;
- a DC potential error PI controller for receiving the DC potential error signal and generating a corresponding angle control signal; and
- a summer for combining the rotor position signal with the angle control signal to generate an active rectifier control signal;
- a vector rotation module for receiving the active rectifier control signal and generating a plurality of vector rotation signals;
- a fixed pattern active rectifier circuit PWM modulator for receiving the vector rotation signals and generating a plurality of active rectifier circuit PWM signals; and
- an active rectifier circuit gate drives module for receiving the active rectifier circuit PWM signals and generating a plurality of active rectifier circuit gate drive signals that drive the fixed pattern active rectifier and inverter system to regulate the DC potential on the DC bus.

13. The generating system of claim 9, further comprising a speed sensor that receives the rotor position signal and generates a rotor speed signal representative of the angular speed of the PM rotor in a rotor speed feedback loop, wherein the control coil current regulator additionally receives the rotor position signal to generate a level of the control coil current that regulates current in the stator to a desired level.

14. The generating system of claim 9, wherein the flux of the control coil magnetic field may selectively saturate a portion of a magnetic circuit associated with the stator to vary the reactance of the stator.

15. The generating system of claim 14, wherein the control coil field flux varies the reactance of the stator to control output current of the PMM through the AC bus.

16. A method of transferring power between a prime mover and a direct current (DC) electrical system that comprises a fixed pattern active rectifier and inverter system coupled between an alternating current (AC) bus and a DC bus by means of a permanent magnet machine (PMM) that has a permanent magnet (PM) rotor coupled to the prime mover and a stator with a multiphase AC winding coupled to the AC bus, comprising the steps of:

generating a magnetic control field by means of electrical control current with flux that varies the reactance of the stator winding with the application of control current;

generating a rotor position signal that is representative of the angular position of the PM rotor;

generating a control field current signal that is representative of the level of electrical current that generates the control field;

generating a DC bus current signal that is representative of the level of DC current through the DC bus; and generating a DC bus potential signal that is representative of the level of DC potential on the DC bus;

wherein the magnetic control field responds to the DC bus current signal in a DC bus current feedback loop and the control field current signal in a control coil current feedback loop to generate a corresponding level of the control coil current that regulates current in the stator to a desired level and in a generating mode the fixed pattern active rectifier and inverter system responds to the DC bus potential signal in a DC bus potential feedback loop and the rotor position signal in a rotor position feedback loop to maintain a constant potential on the DC bus regardless of sudden changes in electrical load on the DC bus.

17. The power transfer method of claim 16, wherein the fixed pattern active rectifier and inverter system converts DC power on the DC bus to AC power on the AC bus in a prime mover starting mode so that the PMM may start the prime mover.

* * * * *